US010823659B2

(12) United States Patent
Li

(10) Patent No.: US 10,823,659 B2
(45) Date of Patent: Nov. 3, 2020

(54) ONE DIMENSIONAL BEAM HOMOGENIZATION WITH A SINGLE ASPHERIC LENS FOR ACCURATE PARTICLE SIZING INSTRUMENTATION

(71) Applicant: Nanozen Industries Inc., Vancouver (CA)

(72) Inventor: Jingwen Li, Vancouver (CA)

(73) Assignee: Nanozen Industries Inc., Vancouver (CA)

(*) Notice: Subject to any disclaimer, the term of this patent is extended or adjusted under 35 U.S.C. 154(b) by 0 days.

(21) Appl. No.: 16/041,951

(22) Filed: Jul. 23, 2018

(65) Prior Publication Data

US 2020/0182773 A1   Jun. 11, 2020

Related U.S. Application Data

(60) Provisional application No. 62/651,904, filed on Apr. 3, 2018.

(51) Int. Cl.
*G01N 15/14* (2006.01)
*G02B 3/04* (2006.01)
*G02B 27/09* (2006.01)
*G02B 5/00* (2006.01)

(52) U.S. Cl.
CPC .......... *G01N 15/1434* (2013.01); *G02B 3/04* (2013.01); *G02B 5/005* (2013.01); *G02B 27/09* (2013.01); *G02B 27/0916* (2013.01); *G02B 27/0927* (2013.01); *G01N 2015/1493* (2013.01)

(58) Field of Classification Search
CPC .......... G02B 3/04; G02B 5/005; G02B 27/09; G02B 27/0916; G02B 27/0927; G01N 15/1434; G01N 2015/1493
See application file for complete search history.

(56) References Cited

U.S. PATENT DOCUMENTS

2017/0082861 A1*   3/2017   Xu .................. H01S 5/005
2017/0299510 A1*  10/2017   Acikalin ............. G01N 21/53

* cited by examiner

*Primary Examiner* — Jack Dinh
(74) *Attorney, Agent, or Firm* — Oyen Wiggs Green & Mutala LLP

(57) ABSTRACT

Beam homogenization with a single aspheric lens that converts the divergent Gaussian intensity profile of a laser diode beam to a convergent beam with a one-dimension flat top profile, which enhances the accuracy of a particle sizing instrument by delivering a uniform amount of energy across an aerosol microfluidic channel.

6 Claims, 9 Drawing Sheets

FIG. 4

| Model | HL6362MG |
|---|---|
| Wavelength | 640nm, Single TE mode operation |
| Divergence (fast axis) | 21° |
| Divergence (slow axis) | 10° |
| Power | 40mW(at 80mA) |
| Emitting dimension (y direction) | ~0.6μm |

FIG. 5

| Aspheric surface | S1 | S2 |
|---|---|---|
| Radius (mm) (R) | 8 | -2.7 |
| Conic constant (K) | -3.9 | -3.85E-02 |
| A2 | -4.9e-5 | 1.39E-03 |
| A4 | 1.6E-03 | 2.27E-03 |
| A6 | 5.2E-04 | 3.77E-03 |
| A8 | -4.7E-04 | 1.15E-04 |
| A10 | 0 | 2.45E-05 |
| A12 | 0 | 3.12E-06 |

Profile measurements of Y coordinates

ONE DIMENSIONAL BEAM HOMOGENIZATION WITH A SINGLE ASPHERIC LENS FOR ACCURATE PARTICLE SIZING INSTRUMENTATION

FIELD OF THE INVENTION

The present invention relates to an optical device that converts the divergent Gaussian intensity profile of a laser diode beam to a convergent beam with a one-dimension flat top profile. This device is a bi-convex singlet aspheric lens involving two aspheric surfaces, which can modify the ray trajectory and thereby achieve flat top profile based on the law of Snell refraction. This optical configuration enhances the accuracy of a particle sizing instrument by delivering a uniform amount of energy across an aerosol microfluidic channel.

BACKGROUND OF THE INVENTION

The output beam of a single mode laser diode light source generally follows a Gaussian type intensity distribution, which is far from uniform. Yet, in many industrial applications, such as laser optical particle counters, laser therapy, laser bio-stimulation, and welding, it is highly desirable that the laser light source present a uniform intensity profile.

Particularly, in optical particle counters, the particle size is correlated with the scattered intensity of each particle. The scattered intensity of each particle depends on the particle size, as well as the energy distribution of the laser beam across the aerosol microfluidic channel. To achieve more accurate particle sizing measurements, it is highly desirable to employ a beam shaping system, which can provide uniform illumination of the particles cross the aerosol channel.

In a typical configuration of an optical counter, a light beam from a laser intersects with the aerosol particle channel. A photo detector is mounted with 90 degrees to the laser beam and the aerosol channel. The photo detector generates electric current pulses in response to scattered light of each particle passing through the laser beam. The scattered intensity by each particle depends on the particle size. Therefore, by registering the scattered intensity of each particle with a photo detector, the particle size can be determined by fitting the measured electrical pulse height to a calibrated curve.

Laser diodes used in most optical particle counters generally have a non-uniform Gaussian energy distribution, which causes severe errors in the conversion of the scattered light intensities into actual particle sizes. Therefore, it is desirable to convert the Gaussian type beam profile of a laser diode to a beam with a more uniform intensity profile, to improve particle sizing accuracy.

In many cases, a flat top beam is obtained by first generating a Gaussian beam from a laser, and then transforming its intensity profile with suitable optical elements. There are different kinds of beam shapers to perform that transformation, including certain combinations of aspheric lenses, Powel lens, micro-optic arrays, diffractive optics, as well as reflective elements. See e.g., F. M. Dickey, "Laser Beam Shaping: Theory and Techniques, Second Edition," CRC press, 2014.

With aspheric lenses, one can obtain good beam flatness with low residual ripples, high power efficiency, and a high damage threshold. Commonly, reshaping a collimated Gaussian beam into a collimated uniform intensity beam can be accomplished by using two aspheric lenses. In this setup, the first lens redistributes the intensity and the second lens collimates the light rays again.

In a design proposed by P. W. Rhodes, and D. L. Shealy, "Refractive optical systems for irradiance redistribution of collimated radiation: their design and analysis," Applied Optics, Vol. 19, No. 20, 3545, 1980, two aspheric lenses are coaxially placed at a certain distance apart. The collimated input rays are refracted on the first lens and then re-collimated by the second lens. Since the rays near the axis experience larger radial magnification than those near the edge, the irradiance across the beam is non-linearly redistributed, and a uniform flat-top profile is formed.

Within the model of geometrical optics, to have a uniform collimated output spatial profile which maintains the original wave front, the following two conditions should be met. First, output intensity equals to input intensity, this is consistent with the energy conservation law, and second, all rays must maintain the same optical path length. By combining the above conditions and Snell's Law, the analytical expressions for aspheric surfaces can be obtained.

Later studies show that, it is possible to shape a Gaussian beam profile into a flat top profile with only a singlet aspheric lens instead of two-lens system. See e.g., S. Zhang, "A simple bi-convex refractive laser beam shaper," Journal of optics A: Pure and Applied Optics, 9, 945, 2007 and S. Zhang, G. Neil and M. Shinn, "Single-element laser beam shaper for uniform flat-top profiles," Optics Express, 11(16) 1942, 2003. We note that, in traditional aspheric lens-based beam-shaping systems, one generally deals with collimated input Gaussian beams. However, because of the divergent nature of most laser sources, an extra aspheric lens is required before the beam-shaping lens to collimate the divergent Gaussian beam. Therefore, even these beam-shaping approaches at least two aspheric lenses are required rather than one, which results in a more complicated system with tricky alignment issues, as well as higher cost. Moreover, another obvious drawback of many beam shapers stems from the fact that they have aspheric concave surfaces, which can be very difficult to manufacture using state-of-the-art optical machining equipment. It may even become impossible in many cases where a small shaper diameter is needed to match the laser beam size, which is usually less than a few millimeters.

Accordingly, for many applications, a simpler, lower-cost solution for a laser diode light source with a uniform intensity profile required. In particular, compact wearable particle sensors and similar industrial instruments are greatly benefited from such a solution.

SUMMARY OF THE INVENTION

In accordance with the present invention a design of a singlet aspheric lens is disclosed, which directly converts a divergent Gaussian beam to a one-dimensional flat top profile at the desired working distance with a more uniform intensity profile. In accordance with yet another aspect of the present invention a method is closed towards the design of singlet optical aspheric lenses for use with other than the preferred specifications of laser diode, working distance, beam width and other parameters.

The singlet lens disclosed significantly simplifies the overall configuration and eases the optical alignment issues in manufacturing, resulting in a very promising development for lower cost instrumentation that has need of such optical requirements. By using convex surfaces, fabrication difficulty and cost are greatly reduced. More importantly, the present invention allows for large apertures, which alleviates severe diffraction effects, and increases the working distance of the shaped output laser beam. Another highly attractive feature of this beam shaping system is that by manipulating the lens position and the working plane distance, one can easily achieve a flat top beam profile with different diameters at different working positions, to suit different applications.

A BRIEF DESCRIPTION OF THE DRAWINGS

The invention may be best understood by reference to the descriptions taken in conjunction with the accompanying drawings, in which:

FIG. 4 shows the specification of a laser diode according to one embodiment of the present invention, which is used and referred to in this specification.

FIG. 5 illustrates the specifications of a lens according to one embodiment of the present invention.

DETAILED DESCRIPTION OF THE PREFERRED EMBODIMENTS

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention, as defined by the appended claims.

Figure 1:
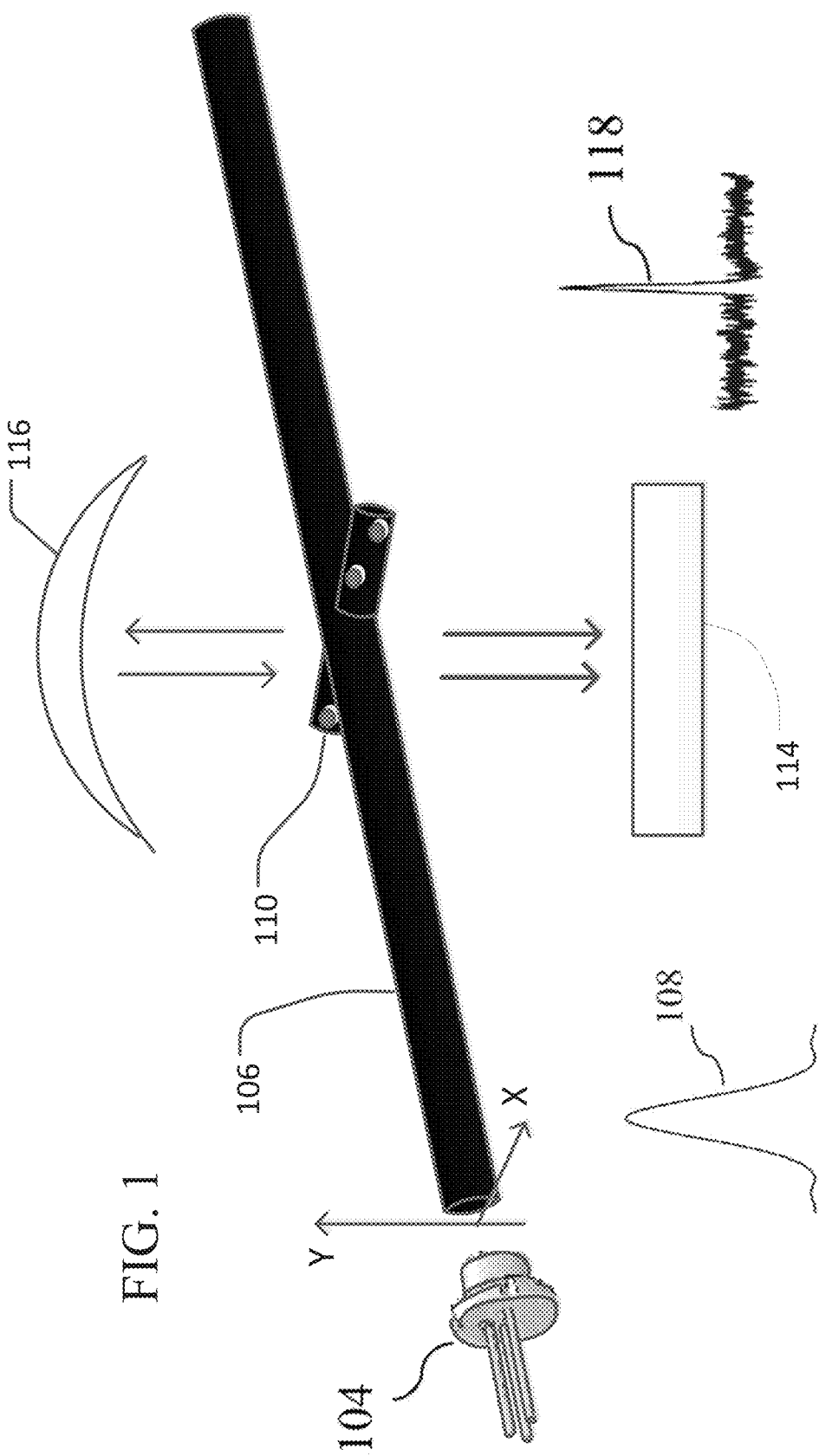
FIG. 1 illustrates the typical configuration of a laser diode used in a particle sizing application.

FIG. 1 illustrates the configuration of an optical particle counter subsystem 100. A laser diode 104, outputs a light beam 106. Said beam has a Gaussian profile in both the x and y direction as shown by 108. The beam 106 transects an aerosol channel 110 carrying particulate matter for analysis. The photodiode 114 is mounted at 90 degrees to the laser beam 106 and the aerosol channel 110. The photodiode 114 generates an electrical pulse shown by 118 in response to the scattering of the light of each particle passing through the laser beam. A mirror 116 can also be used to reflect additional light to the photodiode 114. The size and shape of said electrical pulse 118 provides a measurement of particle size.

Figure 2:
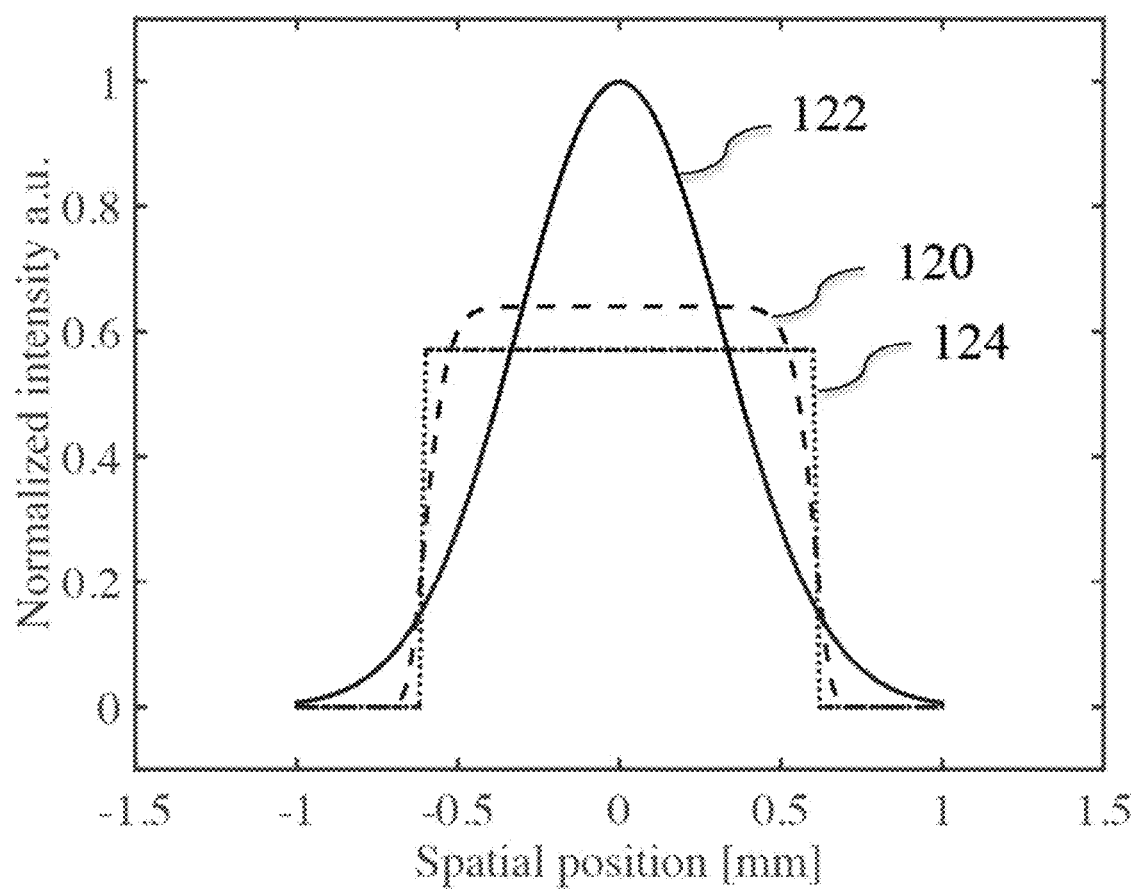
FIG. 2 shows a comparison of a flat-top beam profile in comparison to Gaussian and super-Gaussian intensity profiles.

FIG. 2 Shows a comparison of light profiles. A flat top beam 124 is a light beam with an intensity profile, which is flat over most of the covered area. This is in stark contrast to a Gaussian beam 122, where the intensity smoothly decays from its maximum on the beam axis to zero. Although it is preferable to obtain a flat top beam profile in most industrial applications, an ideal flat top profile is, in fact, hard to achieve. In practice, most of the beam-shaping systems for this purpose typically generate a super-Gaussian profile 120, which has some smooth edges and it can be approximated as a flat top profile. We note that, in this disclosure, for simplicity, in the theoretical calculations, we employ the mathematical rectangle expression to express a flat top profile.

Figure 3:
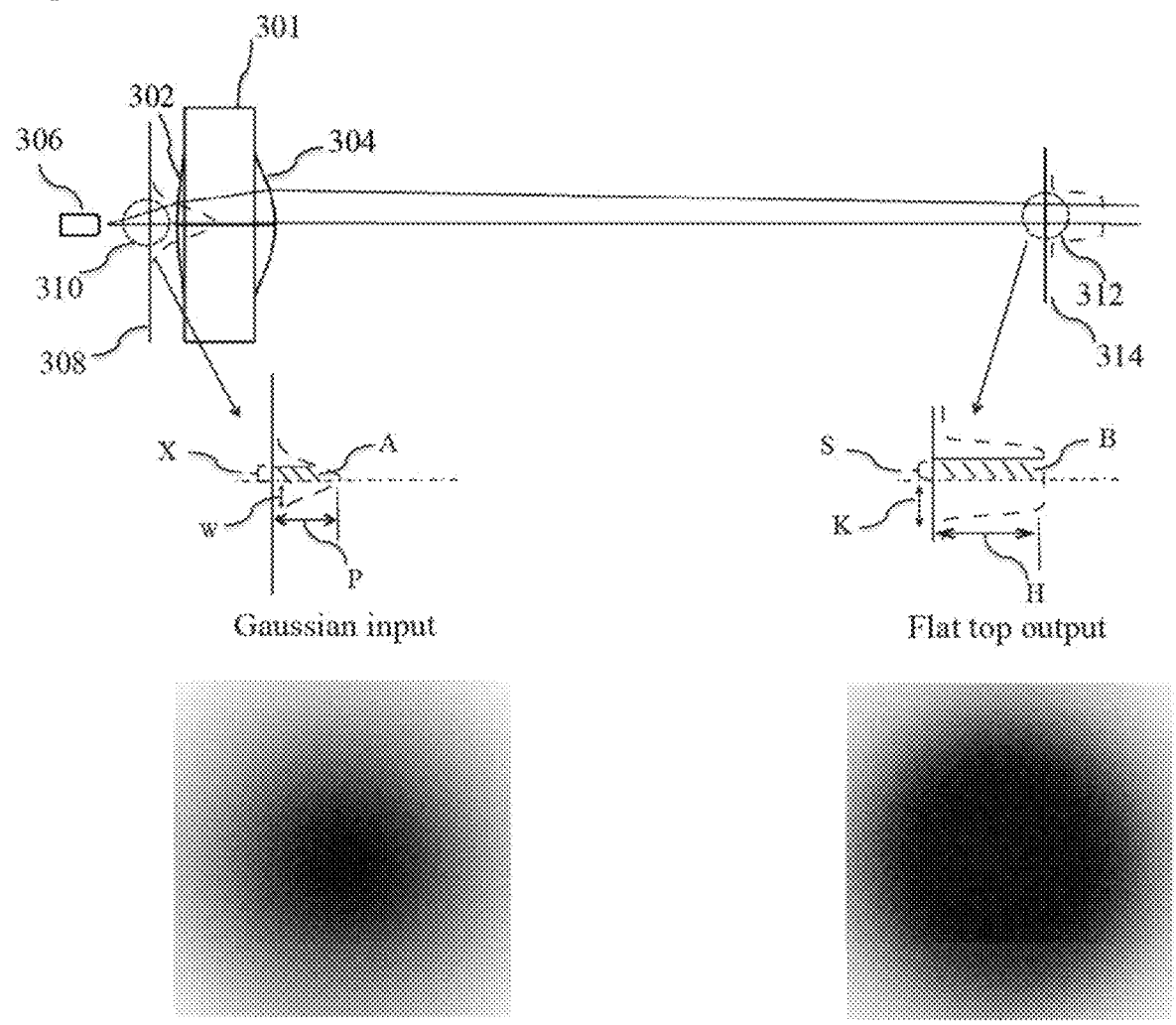
FIG. 3 illustrates a singlet-bi-convex lens converting a divergent Gaussian beam into a slightly converging beam with a flat top intensity profile at a required working distance.

FIG. 3 depicts the use of a singlet bi-convex lens system 300, the bi-convex lens 301 with two aspheric surfaces, the objective side 302 and the image side 304.

The 1D and 2D profiles of the input Gaussian beam 310 and the output flat top beam are illustrated below the lens system 300 illustrating the cross sections of the Gaussian input 310 at plane 308 and the converging flat top beam 312 at plane 314.

We note, that the input encircled energy A at plane 308 can be written as:

$$A = \int_0^X P e^{-\frac{2R^3}{W^2}} 2\pi R dR \tag{1}$$

The output encircled energy B can be written as:

$$B = H\pi S^2 \tag{2}$$

By using substitution, $$U = \frac{-2R^S}{W^2}, dU = \frac{-4R}{W^2}dR, RdR = -\frac{W^2}{4}dU \tag{3}$$

$$A = \frac{-\pi W^2}{2}\int e^U dU = -\frac{\pi PW^2}{2}\left[e^{-2R^2/W^3}\right]_0^X = \frac{\pi PW^2}{2}\left[1 - e^{-2X^3/W^2}\right] \tag{4}$$

Since the two encircled energies are equal, A=B, Thus:

$$S^2 = \frac{PW^2}{2H}\left[1 - e^{-2X^2/W^3}\right] \tag{5}$$

Also, we know that. the total input and output Dowers are equal. Therefore, we have:

$$H\pi K^2 = -\frac{\pi PW^2}{2}\left[e^{-2R^2/W^2}\right]_0^\infty = \frac{\pi PW^2}{2} \tag{6}$$

This means, $$K^2 = \frac{PW^3}{2H} \tag{7}$$

Substituting the above expression in the equation for $S^2$, we get, $$S = K\sqrt{1 - e^{-2X^2/W^2}} \tag{8}$$

Now, we can calculate the output coordinate value S for every input coordinate X (or input beam divergence). By combining the above conditions and Snell's Law, the analytical expressions for the two aspheric surfaces of the singlet lens can be obtained by theoretical calculations. Using these calculations, the designed lens 301 converts a divergent beam 310 from a laser 306 at plane 308, to a slightly convergent output flat top beam 312 with a radius K.

Turning now to FIG. 4, the specifications of the laser diode used in one embodiment of the present invention are detailed. These specifications are then assumed in the remaining detailed description of the singlet lens design describe herein, other laser diode design must incorporate the specifications of individual laser diodes according to the description which follows.

A laser diode has an angular power distribution $I(\varphi_x, \varphi_y)$ given by $$I(\varphi_x, \varphi_y) = I(0, 0)e^{-2\left[\left(\frac{\varphi_x}{\alpha_x}\right)^{2G_x} + \left(\frac{\varphi_y}{\alpha_y}\right)^{2G_y}\right]}$$

where $\varphi_x$ and $\varphi_y$ are the angles formed by the launched ray and the normal to the emitting surface along the horizontal and vertical directions, respectively. $\alpha_x$ and $\alpha_y$ are the $1/e^2$ divergence angles $G_x$ and $G_y$ are the angular super-Gaussian factors. For a typical Gaussian distribution, G is equal to 1.

In addition, each laser diode has a spatial power distribution $F(x, y)$ given by $$F(x, y) = F(0, 0)e^{-2\left[\left(\frac{x}{\omega_x}\right)^{2H_x} + \left(\frac{y}{\omega_y}\right)^{2H_y}\right]}$$

where x and y are the horizontal and vertical positions, respectively, referred to the center of the emitting surface. $\omega_x$ and $\omega_y$ are the $1/e^2$ radii of the ray bundle, $H_x$ and $H_y$ are the spatial super-Gaussian factors. For a typical Gaussian distribution, H is also equal to 1.

The spatial and angular power distributions of the laser diode are assumed to be Gaussian along the fast axis (FA), and super-Gaussian along the slow axis (SA), because the emitter has a nearly rectangular irradiance profile. The aim of the present invention is to convert the Gaussian distribution in the fast axis to a uniform flat top profile, while the distribution in the slow axis is not critical in a particle-sizing instrument application. Therefore, the profile of the slow axis is considered to be the same as that of the fast axis, to facilitate optimization of the spatial intensity uniformity at the target plane.

Under the above-mentioned assumptions, the following optical parameters have been used to model the laser diode beam: The $1/e^2$ beam radius along the SA and FA is assumed to be equal to the half-width of the emitter along the FA, specifically w=0.6 μm. The spatial and angular super-Gaussian factors $H_x$, $H_y$, $G_x$, and $G_y$ along the FA and SA are assumed to be equal to 1 (Gaussian profiles). The $1/e^2$ beam divergences $\alpha_x$ and $\alpha_y$ are set to be 0.366rad (21 degrees).

As is known, aspheric lenses have been routinely defined with the surface profile (sag) given by:

$$Z(r) = \frac{cr^2}{1 + \sqrt{1 - (1 + k)c^2 r^2}} + \sum_{j=1}^{6} A_{2j} r^{2j} \tag{9}$$

where, Z is the sag of surface parallel to the optical axis, r is the radial distance from the optical axis, c is the curvature (inverse of radius), k is the conic constant, A2, A4, A6 . . . are 2nd, 4th, 6th . . . order aspheric coefficients. We note that once the radius and the conic constant of the front and rear surfaces, as well as their aspheric coefficients are determined and the define the lens.

The present invention and the design method described herein appears to be a straight forward methodology. However, those acquainted with the art will be aware that iterations of design simulation, parameter selection, manufacturing, and final testing are all necessary to achieve a lens that meets the final desired goals. Therefore, the parameters provided herein describe one embodiment of the present invention and an alternation in the goals, choice of lens material, and other changes, require a restart of the design process along the lines disclosed.

First, the beam requirements for a particle sizing instrument need to be clarified, according to one embodiment of the present invention. In this design, it is desirable to achieve a beam with flat top profile in the fast axis direction (y direction) at the working distance (i.e., 24 mm from the laser diode emitting point). Referring backwards to FIG. 3, the beam height in y direction should be ~0.8 mm, which is slightly wider that the aerosol channel (0.7 mm), in order to ensure that every particle passing through the aerosol channel is illuminated and sampled. The beam size and the intensity profile on the slow axis direction (x direction) are not critical.

The output beam should be converging to minimize the influence of stray light on the photo detector according to our experimental observations. At the same time, considering the intrinsic safety requirement of commercially particle sizing products, the beam energy cannot be too converging, because the power density along the propagation direction would increase significantly, and exceed the safety threshold. Therefore, there is a tradeoff between these two considerations. Currently, due to the safety issues, the priority of our goal is to achieve a slightly convergent beam (typically 0.024 rad), which has a flat-top beam profile in the fast axis of the laser diode (y direction) at the working distance of 24 mm, where the aerosol particles interact with the laser beam.

It should be noted that since the surface sag of the lens depends on the divergence angle of the laser beam, in the initial design stage the divergence angle is set in the slow axis to be the same with that of the fast axis. This special setting is necessary during optimization of the intensity uniformity on the target plane. After a valid surface shape is achieved the practical divergence of the laser diode is used for further analysis, calculations, and verification. For reference, we note that the laser diode used in this project has a typical divergence of 21° in the fast axis (y direction) and 10° in the slow axis (x direction).

Turning now and referring to FIG. 5, the specifications of a lens according to one embodiment of the present invention are described. The reference designed lens converts a diverging beam from a laser diode to a slightly converging laser beam with a flat top profile in the fast axis direction at the working distance from the laser emitting point. The design description follows.

An efficient way of optimizing the surface shape of such a lens is to perform geometrical ray targets by using numerical calculations or commercially available ray tracing software Optic studio 16.5. By adjusting the surface radius, conic constant, aspheric coefficients, one can achieve the desired beam diameter and intensity uniformity at the target plane, considering a specific illumination condition.

According to one embodiment of the present invention a cost effective optical glass material K-PBK40 with a refractive index of 1.515 as the bi-convex lens material is used.

The lens diameter is designed to be 6 mm, and a nominal thickness of 2.5 nm, which is compatible with our current mechanical design of a particle sizing instrument. To avoid noticeable fluctuations and ripples on the beam intensity profile due to truncation of the laser beam, the clear aperture of the bi-convex lens is designed to be 3 times larger than the beam size.

After numerical calculation and optimization, we find that the lens with the following specifications and the aspheric coefficients shown in FIG. 5, efficiently converted the Gaussian beam profile of the laser diode into a flat top beam profile at the desired working distance.

Referring to FIG. 5. the surface formula for the objective side S1 and the image side S2

$$Z(r) = \frac{r^2/R}{1+\sqrt{1-(1+K)(r^2/R^2)}} - \sum_{j=1}^{6} A_{2j} \cdot r^{2j}$$

$$Z(r) = \frac{r^2/8}{1+\sqrt{1-(1-3.9)(r^2/8^2)}} - \qquad \text{S1}$$
$$0.000049\,r^2 + 0.0016\,r^4 + 0.00052\,r^6 - 0.00047\,r^8$$

$$Z(r) = \frac{r^2/-2.7}{1+\sqrt{1-(1-0.0385)(r^2/2.7^2)}} - 0.00139\,r^2 + 0.0027\,r^4 + \qquad \text{S2}$$
$$0.00377\,r^6 + 0.000115\,r^8 + 0.0000245\,r^{10} + 0.00000312\,r^{12}$$

Figure 6:
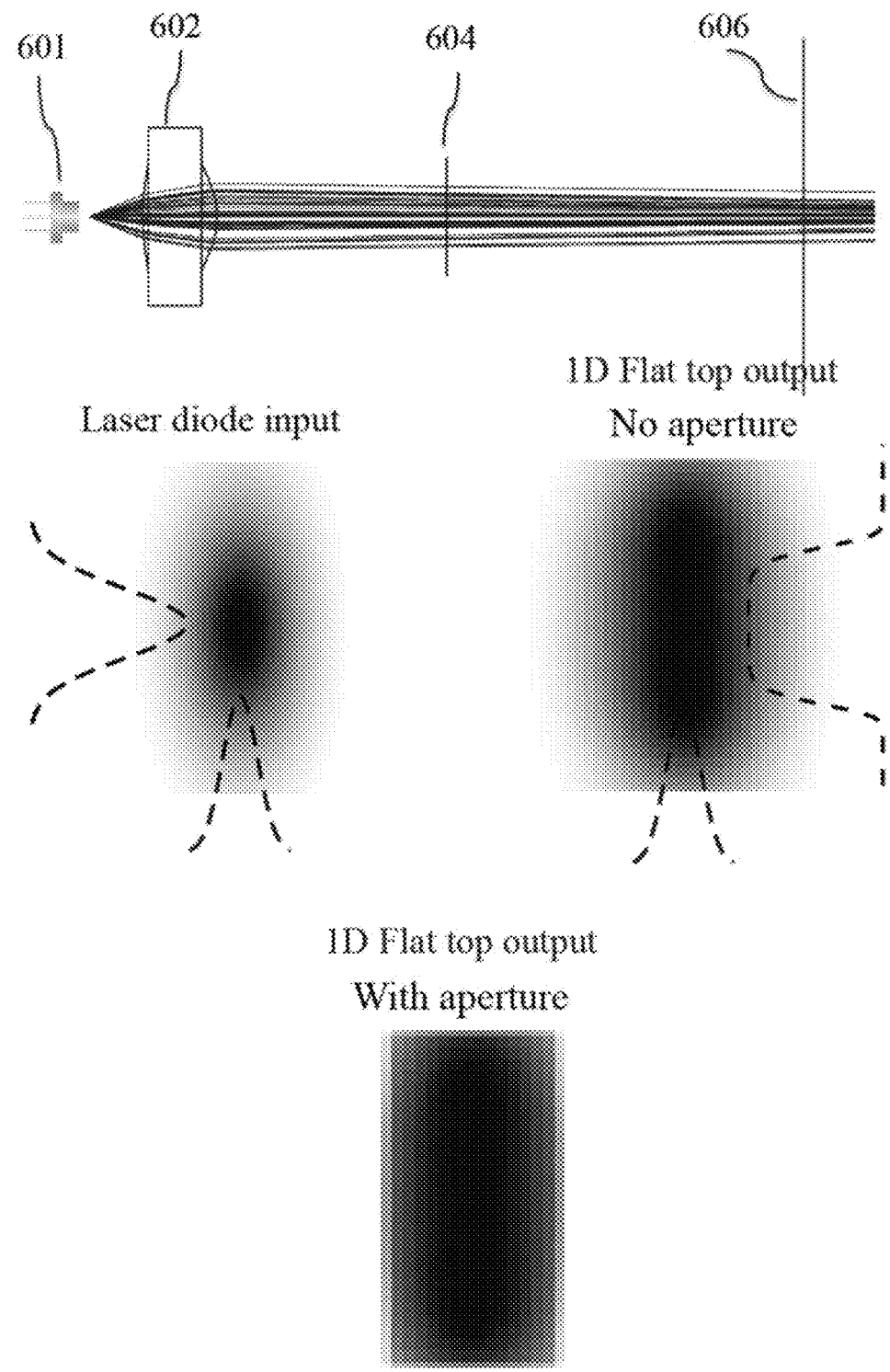
FIG. 6 illustrates a configuration of a singlet bi-convex lens for test and verification purposes.

Turning now to FIG. 6 the configuration of a beam shaping system 600 for test and verification is illustrated. The lens 602 is positioned 3.2 mm to the right of the laser diode 601. An aperture 604 with a rectangular hole is positioned at 10 mm distance from the laser emitting point. We note that since most flat top profiles have smooth edges, as shown previously in FIG. 3, an aperture with an appropriate size is placed after the lens to truncate the smooth edges and further control the beam size. Another advantage of using an aperture is that it minimizes the influence of the stray light on the detector. A detector screen 606 is positioned at 24 mm away from the laser diode, to verify the beam shaping performance.

The gaussian beam profile of the laser diode input and the 1D flat top output beam profile are shown below the system 600.

As expected, because the employed laser diode has a divergence angle of 21° and 10° in the fast and slow axis respectively, the output beam features a one-dimensional flat top profile at the working distance (24 mm), while the other dimension remains a Gaussian profile. This is easy to rationalize that previously designed bi-convex lens can only convert a laser beam with 21° divergence to a flat top beam profile. We also restate that such a one-dimension beam profile is sufficient for particle sizing applications. By controlling the aperture size, one can optimize the flat-top beam profile and minimize the influence of stray light on the detector. The aperture size is typically designed to match the beam size to maximize the coupling efficiency and minimize the diffraction effect. One example of the influence of the aperture on the beam profile is shown at the bottom of FIG. 6.

Figure 7:
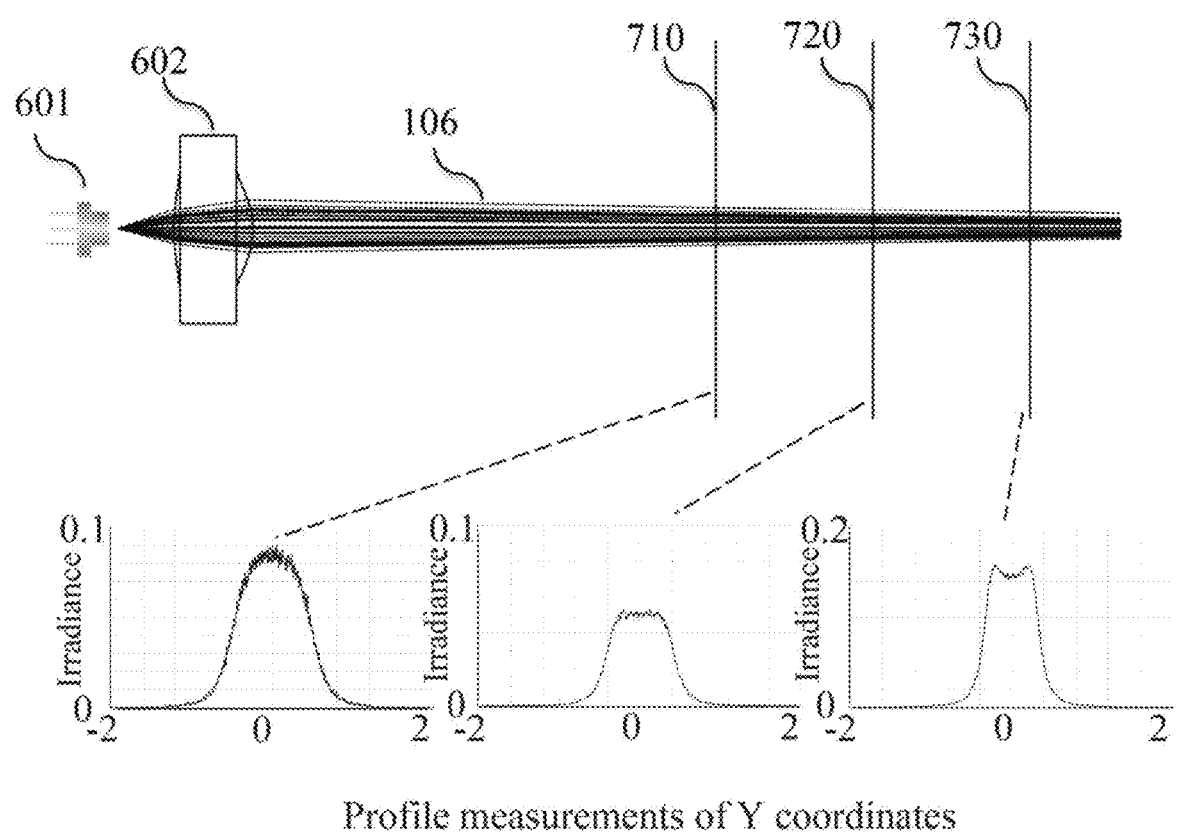
FIG. 7 illustrates the flat top beam profile of the present invention at different distances from the laser diode emitting point.

Turning now to FIG. 7, the achieved flat-top intensity profile of the laser beam is shown. In contrast to the initial laser diode Gaussian beam, a flat top beam is not a free space mode, which means that the intensity profile varies as the beam propagates. To illustrate this, in FIG. 7, we plot the beam profile at three distances, which are 19 mm (before the working distance), 24 mm (at the working distance), as well as 29 mm (after the working distance). The profile evolves from a 'bulging' profile at shorter distance to a flat top profile at the working plane, and eventually becomes 'notching' as the distance increases. It is, therefore, necessary to verify the effective working range of the beam shaping system. Theoretically, we determined singlet bi-convex lens of the present invention had a predicted effective range of 2 mm (i.e., 23 mm-25 mm). Within this range, it can be considered that a good flat top profile is achieved. Since the diameter of aerosol channel in a particle-sensing instrument, in one embodiment of the current invention, is ~0.7 mm, this design with an effective working range of 2 mm is sufficient for this application and provides flexibility and tolerance for mechanical and aerodynamic design.

Figure 8A:
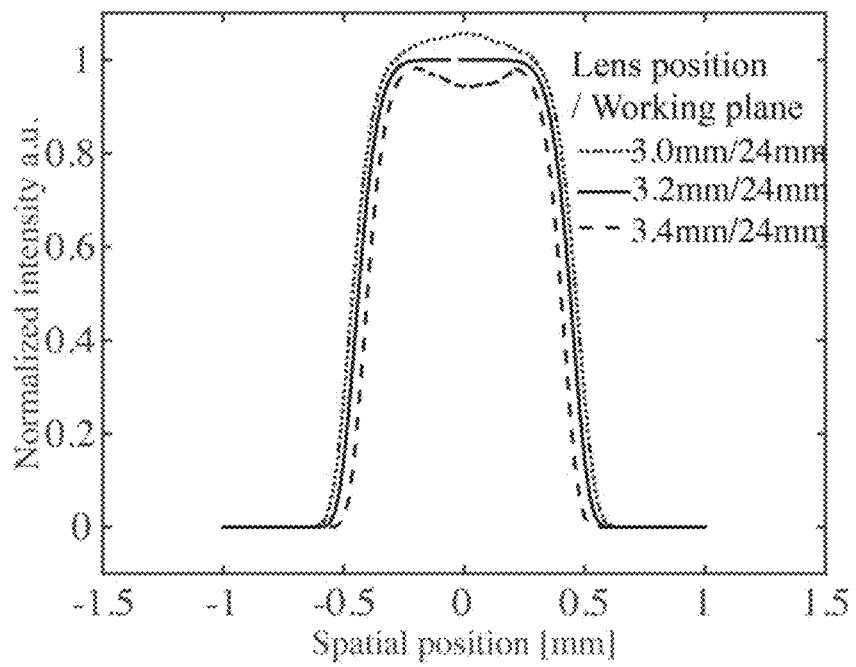
FIG. 8a illustrates the influence of the lens position on the beam intensity profile, while the working distance is fixed at 24 mm.

FIG. 8a shows the influence of lens position on the beam intensity profile at a fixed working distance of 24 mm. It is possible to improve flat top beam quality under some non-ideal conditions by adjusting the distance between the lens and laser emitting point. As an example, in FIG. 8, we show the influence of the lens position on the intensity profile of the beam, while the working distance is fixed to be 24 mm. As expected, when the lens is placed closer to the emitting point, the beam size is larger, and the profile becomes bulging. At the same time, when the lens is placed further from the emitting point, the beam size is smaller, and the profile looks notching. Therefore, by adjusting the lens position, one can tune the intensity profile of the laser beam.

Figure 8B:
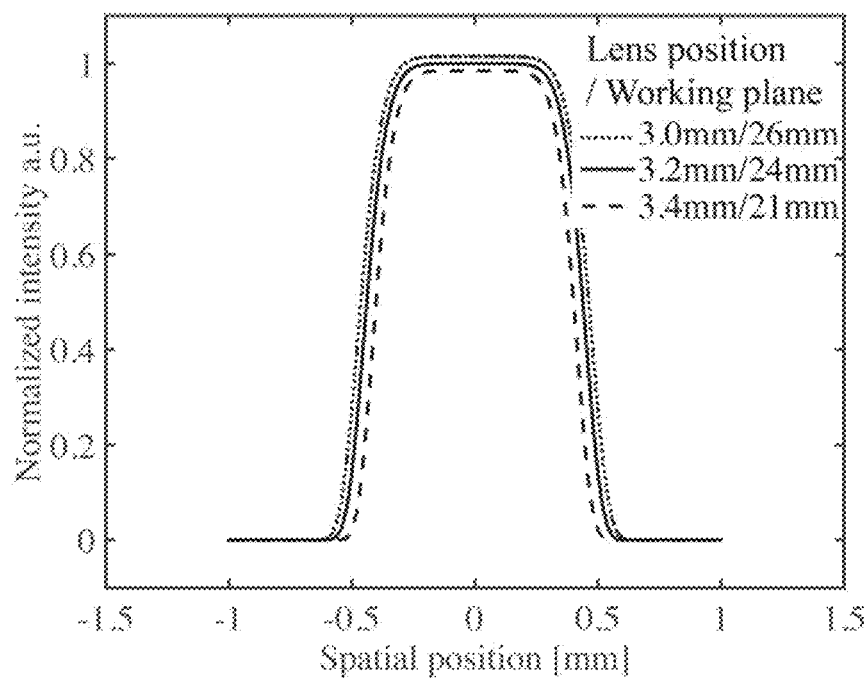
FIG. 8b illustrates the intensity profile of the flat top beam at different combinations of lens position and working plane position.

FIG. 8b shows the calculated intensity profile of the flat top laser beam a different combinations of lens position and working plane position. Another attractive feature of the singlet bi-convex lens is illustrated, that is, by simply manipulating the lens position and the working distance position, one can easily achieve flat top beam profile with different diameters. In each case, a good flat top profile is achieved, with only a slight difference in the beam size. This provides another flexibility for mechanical and aerodynamic design, and its potential to suit different applications when flat top profile with different beam size is required.

Figure 9A:
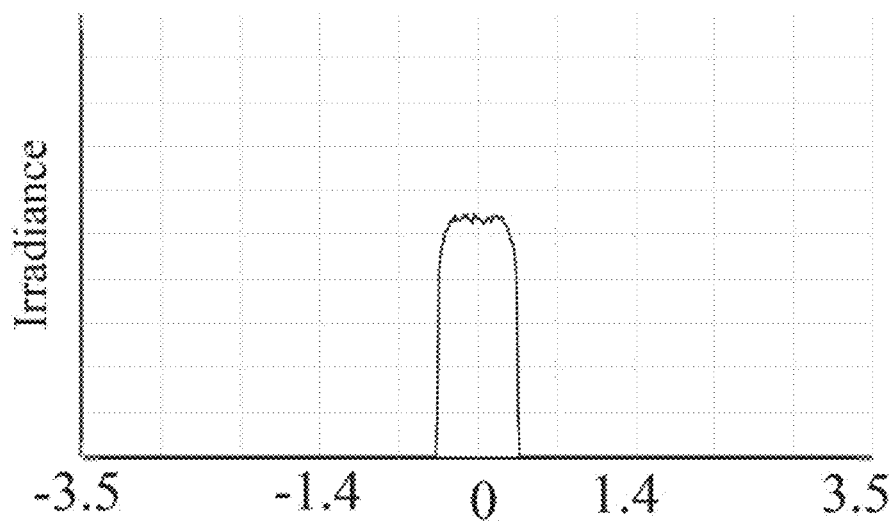
FIG. 9a illustrates the comparison of the beam profile calculated with wave optics.
Figure 9B:
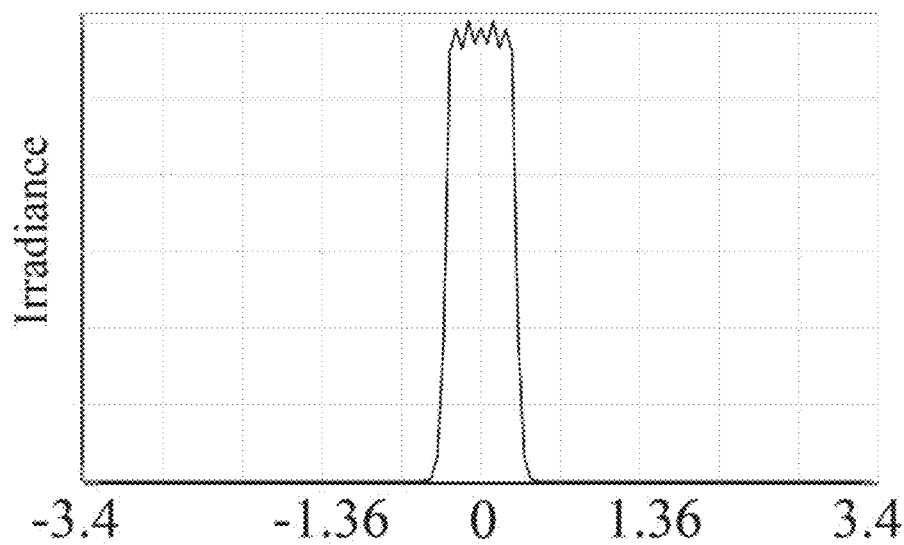
FIG. 9b illustrates the comparison of the beam profile calculated with geometrical optics.

In previous sections, we have disclosed a design of a beam-shaping element based on geometrical ray tracing. In fact, geometrical ray tracing is an incomplete description of light propagation. Strictly speaking, the propagation of light is a coherent process, as the wave front travels through free space or optical medium, the wave front coherently interferes with itself. In what follows, we use wave optics and diffraction calculations to propagate a wave front through an optical system surface by surface. In this approach, the coherent nature of light is fully accounted. Moreover, it also considers the diffraction effect due to beam truncations by lenses or apertures. In what follows, we verify the laser beam propagation and intensity profile with this approach. For comparison, the beam profile of the same optic configuration calculated using geometrical optics and wave optics is shown in FIG. 9a and FIG. 9b respectively. Generally, the simulated beam profile and size show a good agreement with that of the simulation based on geometrical optic ray tracing. Nevertheless, we notice that the beam truncation by the aperture (or the lens) cause noticeable ripples with 3% intensity fluctuation. Such a fluctuation is normally tolerable in optical particle counters.

In summary, the main advantages of the present invention are four-fold. First, such a singlet bi-convex lens can directly convert the divergent Gaussian beam from a laser diode to a flat-top beam profile in fast axis direction without first collimating the beam as employed in prior work. This significantly simplifies overall configuration and eases the optical alignment in manufacturing. Second, by using a singlet bi-convex lens, fabrication difficulty and cost are reduced. Third, this design allows for large apertures, which alleviates severe diffraction effects and minimizes intensity speckles and fluctuations at the target plane. Finally, by simply manipulating lens position and the working distance, one can easily achieve flat top beam profile with different diameters to suit a variety of different applications above the application described by the present invention.

From the foregoing, it will be appreciated that specific examples of apparatus and methods have been described herein for purposes of illustration, but that various modifications, alterations, additions, and permutations may be made without departing from the practice of the invention. The embodiments described herein are only examples. Those skilled in the art will appreciated that certain features of embodiments described herein may be practiced or implemented without all of the features ascribed to them herein. Such variations on described embodiments that would be apparent to the skilled addressee, including variations comprising mixing and matching of features from different embodiments are within the scope of this invention.

What is claimed is:

1. A light source for illuminating an aerosol flow containing particulate matter for analysis, comprising:
   a laser diode;
   a bi-convex singlet aspheric lens;
   said aspheric lens having an objective side aspheric profile satisfying the equation:

$$Z(r) = \frac{r^3/R}{1+\sqrt{1-(1-K)(r^2/R^2)}} + A2 \cdot r^2 + A4 \cdot r^2 + A6 \cdot r^2 + A8 \cdot r^2;$$

and
   an image side aspheric profile satisfying the equation:

$$Z(r) = \frac{r^3/R}{1+\sqrt{1-(1-K)(r^2/R^2)}} +$$

$$A2 \cdot r^2 + A4 \cdot r^2 + A6 \cdot r^2 + A \cdot r^2 8 + A10 \cdot r^2 + A12 \cdot r^2;$$

where A represents the $2^{nd}$, $4^{th}$, $6^{th}$, $8^{th}$, $10^{th}$ and $12^{th}$ order aspheric coefficients respectively; and where R denotes the radius of the curvature of the vertex of the aspheric lens surface; and K denotes the conic constant; and
an aerosol flow at a working distance from said laser diode emitting point;
wherein the ray trajectory of a divergent Gaussian light beam from said laser diode is modified to a convergent flat top profile light beam in the fast axis direction at said aerosol flow.

2. The singlet aspheric lens of claim 1 where the variables of the expression for said objective aspheric surface are:
   R=8
   K=3.9
   A2=−4.9e−5
   A4=1.6e−03
   A6=5.2e−04
   A8=−4.7e−04.

3. The singlet aspheric lens of claim 1 where the variables of the expression for said image aspheric surface are:
   R=−2.7
   K+−3.85e−02
   A2=1.39e−03
   A4=2.27e−03
   A6=3.77e−03
   A8=1.15e−04
   A10=2.45e−05
   A12=3.12e−06.

4. The singlet aspheric lens of claim 1 where the said working distance is 24 mm from the laser diode emitting point.

5. The singlet aspheric lens of claim 1 wherein said lens is constructed of K-PBK40 material.

6. The light source of claim 1, including:
   a rectangular aperture placed between said aspheric lens and said aerosol flow,
   whereby said aperture truncates the smooth edges of said flat top beam and controls said beam size at said aerosol flow.

* * * * *